United States Patent
Simpson et al.

(10) Patent No.: US 9,667,918 B2
(45) Date of Patent: May 30, 2017

(54) NETWORK RECORDING SYSTEM

(75) Inventors: Anita Hogans Simpson, Decatur, GA (US); James Carlton Bedingfield, Sr., Lilburn, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 285 days.

(21) Appl. No.: 12/390,221

(22) Filed: Feb. 20, 2009

(65) Prior Publication Data

US 2010/0218223 A1  Aug. 26, 2010

(51) Int. Cl.
*H04N 7/173* (2011.01)
*H04N 5/782* (2006.01)
*H04N 21/2747* (2011.01)
*H04N 21/433* (2011.01)
*H04N 21/442* (2011.01)
*H04N 21/472* (2011.01)

(52) U.S. Cl.
CPC ............. *H04N 7/173* (2013.01); *H04N 5/782* (2013.01); *H04N 21/2747* (2013.01); *H04N 21/4334* (2013.01); *H04N 21/44209* (2013.01); *H04N 21/47214* (2013.01)

(58) Field of Classification Search
CPC ................ H04N 21/274; H04N 21/2747
USPC ................... 725/115, 134, 142, 145
See application file for complete search history.

(56) References Cited

U.S. PATENT DOCUMENTS

| | | | |
|---|---|---|---|
| 6,751,297 B2 | 6/2004 | Nelkenbaum | |
| 2001/0037499 A1 | 11/2001 | Turock | |
| 2002/0071529 A1 | 6/2002 | Nelkenbaum | |
| 2002/0174430 A1* | 11/2002 | Ellis | G11B 27/005 725/46 |
| 2003/0208763 A1* | 11/2003 | McElhatten et al. | 725/58 |
| 2005/0034171 A1 | 2/2005 | Benya | |
| 2005/0144640 A1* | 6/2005 | Fritsch et al. | 725/58 |
| 2005/0183115 A1 | 8/2005 | Maruyama et al. | |
| 2005/0196145 A1 | 9/2005 | Nakamura | |
| 2005/0229212 A1 | 10/2005 | Kuether et al. | |
| 2005/0261965 A1 | 11/2005 | Elsen et al. | |
| 2006/0041546 A1 | 2/2006 | Ahn | |
| 2006/0053456 A1 | 3/2006 | Kelly | |
| 2006/0095410 A1 | 5/2006 | Ostrover et al. | |
| 2006/0218604 A1 | 9/2006 | Riedl et al. | |
| 2006/0230107 A1 | 10/2006 | Yu et al. | |
| 2006/0242678 A1 | 10/2006 | Kostadinovich | |
| 2007/0079340 A1* | 4/2007 | McEnroe | H04N 7/163 725/78 |
| 2007/0100839 A1 | 5/2007 | Kim et al. | |
| 2007/0104456 A1* | 5/2007 | Craner | 386/83 |
| 2007/0106681 A1 | 5/2007 | Haot et al. | |
| 2007/0155306 A1 | 7/2007 | Koli et al. | |
| 2007/0162947 A1 | 7/2007 | Bertin | |
| 2007/0220581 A1 | 9/2007 | Chang | |
| 2007/0294737 A1* | 12/2007 | Edwards et al. | 725/112 |
| 2008/0046578 A1 | 2/2008 | Van Der | |
| 2008/0141309 A1* | 6/2008 | Barsness | 725/58 |

(Continued)

*Primary Examiner* — Junior Mendoza
(74) *Attorney, Agent, or Firm* — Jackson Walker L.L.P.

(57) ABSTRACT

A network recording system records multimedia programs responsive to transport streams being unavailable. A first portion of a multimedia program may be stored on a customer premises equipment and a second portion stored on the network recording system. The network recording system may transport the multimedia program via file download or real-time streaming.

19 Claims, 4 Drawing Sheets

(56) References Cited

U.S. PATENT DOCUMENTS

| | | | |
|---|---|---|---|
| 2008/0163322 A1 | 7/2008 | Park et al. | |
| 2008/0193104 A1 | 8/2008 | Hasek | |
| 2008/0282312 A1* | 11/2008 | Blinnikka | 725/153 |
| 2008/0285936 A1* | 11/2008 | Yampanis et al. | 386/46 |
| 2008/0285945 A1 | 11/2008 | Rajakarunanayake et al. | |
| 2009/0031390 A1 | 1/2009 | Rajakarunanayake et al. | |
| 2009/0165072 A1* | 6/2009 | Wright-Riley | 725/127 |
| 2009/0199232 A1* | 8/2009 | Takeyama et al. | 725/33 |
| 2009/0217337 A1* | 8/2009 | Åström | 725/115 |
| 2010/0005499 A1* | 1/2010 | Covey | 725/109 |
| 2013/0272684 A1* | 10/2013 | Kinoshita et al. | 386/297 |

* cited by examiner

NETWORK RECORDING SYSTEM

BACKGROUND

Field of the Disclosure

The present disclosure generally relates to multimedia content distribution networks and more particularly to network recording systems.

Description of the Related Art

Multimedia programs may be received from a multimedia content distribution network (MCDN) and recorded using a personal video recorder (PVR). An MCDN may limit the number of available transport streams for delivering the multimedia programs to a user. For example, a user may be allotted two high definition transport streams and two standard definition streams. Such limitations may prevent a user of traditional systems from simultaneously recording three high definition multimedia programs (e.g., movies).

DESCRIPTION OF EXEMPLARY EMBODIMENTS

Figure 1:
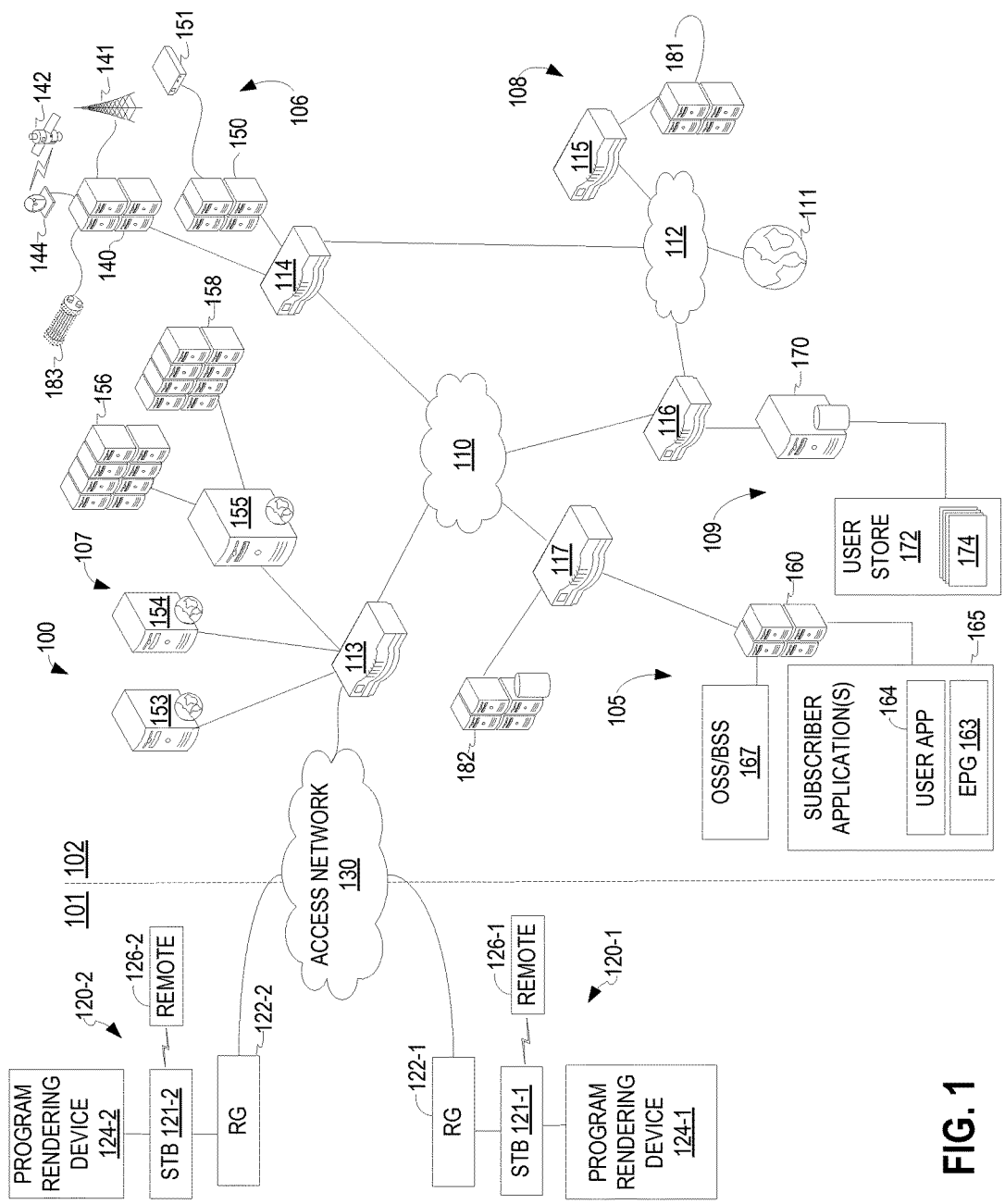
FIG. 1 illustrates a representative Internet protocol television (IPTV) architecture for providing multimedia programs and, in accordance with disclosed embodiments, implementing a network recording system.

Television programs, video on-demand (VOD) movies, digital television content, music programming, and a variety of other types of multimedia content may be distributed to multiple users (e.g., subscribers) over various types of networks. Suitable types of networks that may be configured to support the provisioning of multimedia content services by a service provider include, as examples, telephony-based networks, coaxial-based networks, satellite-based networks, and the like.

In some networks including, for example, traditional coaxial-based "cable" networks, whether analog or digital, a service provider distributes a mixed signal that includes a large number of multimedia content channels (also referred to herein as "channels"), each occupying a different frequency band, frequency channel, digital time slot, or digital code space through a coaxial cable, a fiber-optic cable, or a combination of the two. This type of content distribution is typically shared, because all content is simultaneously presented to all users for potential consumption (possibly limited, for example, by the user subscription profile). All physical network implementations have limitations. For example, the bandwidth required to transport simultaneously a large number of multimedia channels may challenge the bandwidth capacity of cable-based networks. In these types of networks, a tuner or digital decoder within a set-top box (STB), television, or other form of receiver is required to select a channel from the mixed signal for playing or recording. A user wishing to play or record multiple channels typically needs to have distinct tuners or decoders for each desired channel. This can be an inherent limitation of cable networks and other mixed signal networks.

In contrast to mixed signal networks, IPTV networks generally distribute content to a user only in response to an explicit user request so that, at any given time, the number of content "channels" being provided to a user is relatively small, e.g., one channel for each operating television plus possibly one or two channels for simultaneous recording. As suggested by the name, IPTV networks typically employ IP and other open, mature, and pervasive networking technologies to distribute multimedia content. Instead of being associated with a particular frequency band, digital time slot, or the like, an IPTV television program, movie, or other form of multimedia content is a packet-based stream that corresponds to a particular network endpoint, e.g., an IP address and a transport layer port number. In these networks, the concept of a channel is inherently distinct from the frequency channels native to mixed signal networks. Moreover, whereas a mixed signal network requires a hardware intensive tuner for every channel to be played, IPTV channels can be "tuned" simply by transmitting to a server an indication of a network endpoint that is associated with the desired channel. However, the number of simultaneous streams available to the user is limited by the data capacity of the transport network. This limitation is one reason an MCDN may, as described above, limit the number of transport streams available to a subscriber.

IPTV may be implemented, at least in part, over existing infrastructure including, for example, a proprietary network that may include existing telephone lines, possibly in combination with CPE devices including, for example, a digital subscriber line (DSL) modem in communication with an STB, a display, a PVR, a digital video recorder (DVR), a program rendering device, and other appropriate equipment to receive multimedia content and convert it into usable form. In some implementations, a core portion of an IPTV network is implemented with fiber optic cables while the so-called "last mile" may include conventional, unshielded, twisted-pair, copper cables. IPTV may also make use of the multi-cast data distribution method to improve network efficiency.

IPTV networks inherently support bidirectional (i.e., two-way) communication between a subscriber's CPE and a service provider's equipment. Bidirectional communication allows a service provider to deploy advanced features, such as VOD, pay-per-view (PPV), electronic programming guides (EPGs), and the like. Bidirectional networks may also enable a service provider to collect information related to user preferences, whether for purposes of providing preference-based features to the user, providing potentially valuable information to service providers, or providing potentially lucrative information to content providers and others.

Disclosed systems relate to network-based recording systems. In one aspect, a disclosed process for recording a multimedia program includes receiving a user selection of a multimedia program and determining whether any transport stream is available for streaming the multimedia program to the user. If no transport stream is available, the process includes storing the multimedia program on a network recording system. The user may be provided an indication (e.g., a textual overlay notification on a television display) that the multimedia program is stored or scheduled to be stored on the network recording system. In addition to storing the multimedia program, metadata for the multimedia program may be stored on the network recording system.

For example, cast member information, production information, rating information, and the like may be stored as metadata on the network recording system and made available to a user at the time the stored multimedia program is consumed (e.g., viewed). Transporting the stored multimedia program to the user may be by various means including downloading (e.g., file transfer protocol (FTP) download) and real-time streaming (i.e., streaming the stored multimedia program while it is viewed on a user CPE device).

Disclosed systems may check network recording system storage to determine whether requested multimedia content is already stored or being stored to the network recording system. If so, disclosed processes may include saving pointers that indicate a start frame and an end frame that act as "bookends" to a portion of the multimedia program available to the user for playback. In some embodiments, if a viewer selects another channel during a viewing session, recording of the multimedia content from the previous channel to the network recording system is stopped and the pointer corresponding to the stored multimedia program is purged.

In another aspect, a disclosed network recording server includes a tangible computer readable medium with computer readable instructions for implementing a rules module that receives a user request to record a multimedia program and determines whether to store the multimedia program to the network recording server. The rules module to determine whether to store the multimedia program may first consider whether a user subscribes to a stream overflow service. In addition, the rules module may consider whether any of a limited number of transport streams is available to the user. The rules module may further consider whether the user has met or exceeded an allotted storage capacity. The rules module may also consider digital rights specifications provided by the content provider in determining whether the requested content is eligible for recording, whether recording may start at the beginning of the content, and how long the recorded content may be stored. A scheduling module schedules the recording of the multimedia program in response to the rules module determining to store the multimedia program. Multimedia programs scheduled for recording may be recorded by a recording module. The recording module may store a portion of the multimedia program, the entire multimedia program, a pointer indicating the beginning of a user recording, and a pointer indicating the end of a user recording.

If a multimedia program is already stored (e.g., due to a previous recording request from another user), or is being stored, the disclosed network recording system may conserve storage resources by storing a beginning pointer corresponding to the point at which a user wishes to begin recording and an end pointer corresponding to the point at which a user wishes to end recording. In some cases, a user wishes to record an entire multimedia program. In such cases, the beginning pointer points to the beginning of the multimedia program and the end pointer points to the end (e.g., to the last frame) of the multimedia program.

In some embodiments, the recording module for disclosed network recording servers stores popular multimedia programs to anticipate user requests to record the programs. Accordingly, if a user requests to record a popular multimedia program that is pre-recorded, re-recording the entire popular multimedia program may be avoided and pointers for the start frame and end frame for each user's record request may instead be stored.

In some embodiments, a first portion of a multimedia program may be recorded by a user CPE device and a second portion of the multimedia program may be recorded by a disclosed network recording system. This may occur if, while a CPE is recording a multimedia program, a user exceeds an allotted number of transport streams. For example, if a user is allotted only two high definition streams and the user is using both high definition streams to simultaneously record two high definition movies, a user request to view high definition broadcast in real-time would exceed the allotted number of high definition streams. Accordingly, in response to the user request to view (i.e., to exceed the allotted number of transport streams) the third high definition stream, a second portion of the multimedia program being recorded by the user CPE device may be recorded to the network recording system and thereby permit viewing of the third high definition stream. Disclosed embodiments may store data corresponding to markers or pointers used by CPE devices and networking recording systems to allow seamless transport of the multimedia program to the user during playback.

In cases in which portions of a multimedia program are stored both to a local CPE device and to a network recording system, a user may be provided an indication (e.g., a textual overlay message on a television display) that the network recording system is recording or has recorded a second portion of the multimedia program. When a transport stream becomes available, the network recording system may download the second portion of the multimedia program to the user CPE. Alternatively, during playback of the recorded multimedia program, the user CPE may retrieve the first portion of the recorded multimedia program from local storage (e.g., from a local hard drive) and a second portion of the multimedia program from the network recording system in real-time as it is presented to the user.

After a multimedia program is recorded to the network recording system, a transport module transports the multimedia programs to a user CPE device (e.g., an STB). The transport module may download (e.g., by FTP download) the recorded multimedia program or may stream the recorded multimedia program in real-time while it is presented by a user CPE device (e.g., a program rendering device). Transport of the multimedia program may occur during off-peak hours in response to a user request, or in response to an automated CPE device request that indicates, for example, that a transport stream is available.

In still another aspect, a disclosed service for recording a multimedia program includes receiving a user request to receive a multimedia program. The request to receive the multimedia program may be a request to record the multimedia program at a future time or to view the multimedia program immediately. The disclosed service includes detecting whether a transport stream is available to transfer the multimedia program to a user CPE device. Available transport streams may include IPTV transport streams. For example, a user may be allotted two high definition streams and two standard definition streams. If a user is currently recording content provided by two high definition streams and the user requests to record content via an unavailable, third high definition stream, a disclosed service may notify the user that a third high definition stream is not available and that the requested multimedia program will be recorded to a network recording system for later transport to the user. Once a transport stream becomes available, a recorded multimedia program may be transported to the user CPE device.

Below, exemplary embodiments are described in sufficient detail to enable one of ordinary skill in the art to practice the disclosed subject matter without undue experimentation. It should be apparent to a person of ordinary skill that the disclosed examples are not exhaustive of all possible embodiments. Regarding reference numerals used to describe elements in the figures, a hyphenated form of a reference numeral may refer to a specific instance of an element and an un-hyphenated form of the reference numeral may refer to the element generically or collectively. Thus, for example, element 121-1 refers to an instance of an STB, which may be referred to collectively as STBs 121 and any one of which may be referred to generically as an STB 121.

Referring now to the drawings, FIG. 1 illustrates selected aspects of an MCDN 100 for transporting recommended multimedia programs for recording. MCDN 100, as shown, is a multimedia content provider network that may be generally divided into a client side 101 and a service provider side 102 (a.k.a., server side 102). Client side 101 includes all or most of the resources depicted to the left of access network 130 while server side 102 encompasses the remainder.

Client side 101 and server side 102 are linked by access network 130. In embodiments of MCDN 100 that leverage telephony hardware and infrastructure, access network 130 may include the "local loop" or "last mile," which refers to the physical cables that connect a subscriber's home or business to a local exchange. In these embodiments, the physical layer of access network 130 may include both twisted pair copper cables and fiber optics cables. In a fiber to the curb (FTTC) access network, the "last mile" portion that employs copper is generally less than approximately 300 feet in length. In fiber to the home (FTTH) access networks, fiber optic cables extend all the way to the premises of the subscriber.

Access network 130 may include hardware and firmware to perform signal translation when access network 130 includes multiple types of physical media. For example, an access network that includes twisted-pair telephone lines to deliver multimedia content to consumers may utilize DSL. In embodiments of access network 130 that implement FTTC, a DSL access multiplexer (DSLAM) may be used within access network 130 to transfer signals containing multimedia content from optical fiber to copper wire for DSL delivery to consumers.

Access network 130 may transmit radio frequency (RF) signals over coaxial cables. In these embodiments, access network 130 may utilize quadrature amplitude modulation (QAM) equipment for downstream traffic. Also in these embodiments, access network 130 may receive upstream traffic from a consumer's location using quadrature phase shift keying (QPSK) modulated RF signals.

Services provided by the server side resources as shown in FIG. 1 may be distributed over a private network 110. In some embodiments, private network 110 is referred to as a "core network." In at least some embodiments, private network 110 includes a fiber optic wide area network (WAN), referred to herein as the fiber backbone, and one or more video hub offices (VHOs). In large-scale implementations of MCDN 100, which may cover a geographic region comparable, for example, to the region served by telephony-based broadband services, private network 110 includes a hierarchy of VHOs and may further include one or more super hub offices (SHOs).

A national SHO, for example, may deliver national content feeds to several regional VHOs, each of which may include its own acquisition resources to acquire local content, such as the local affiliate of a national network, and to inject local content such as advertising and public service announcements (e.g., emergency alert system messages) from local entities. The regional VHOs may then deliver the local and national content to users served by the regional VHO. The hierarchical arrangement of VHOs, in addition to facilitating localized or regionalized content provisioning, may conserve bandwidth by limiting the content that is transmitted over the core network and injecting regional content "downstream" from the core network.

Segments of private network 110, as shown in FIG. 1, are connected together with a plurality of network switching and routing devices referred to simply as switches 113 through 117. The depicted switches include client facing switch 113, acquisition switch 114, operations-systems-support/business-systems-support (OSS/BSS) switch 115, database switch 116, and an application switch 117. In addition to providing routing/switching functionality, switches 113 through 117 preferably include hardware or firmware firewalls, not depicted, that maintain the security and privacy of network 110. Other portions of MCDN 100 may communicate over a public network 112, including, for example, an Internet or other type of Web network which is signified in FIG. 1 by the World Wide Web icon 111.

As shown in FIG. 1, client side 101 of MCDN 100 depicts two of a potentially large number of client side resources referred to herein simply as client(s) 120. Each client 120, as shown, includes an STB 121, a residential gateway (RG) 122, a program rendering device 124, and a remote control device 126. An example program rendering device is a television. In the depicted embodiment, STB 121 communicates with server side devices through access network 130 via RG 122.

As shown in FIG. 1, RG 122 may include elements of a broadband modem (e.g., DSL modem or cable modem) and may communicate over wireless and/or wired interfaces. In addition, RG 122 may have elements of a firewall, router, switch, and access point for local area network (LAN) devices to communicate through wired and wireless (e.g., WiFi) Ethernet or other suitable networking technologies. In some embodiments, STB 121 is a uniquely addressable Ethernet compliant device. Program rendering device 124 may be, for example, any National Television System Committee (NTSC) and/or Phase Alternating Line (PAL) compliant television or other program rendering device. Both STB 121 and program rendering device 124 may include any form of conventional frequency tuner. As shown, remote control device 126 communicates wirelessly with STB 121 using infrared (IR) or RF signaling.

In IPTV compliant implementations of MCDN 100, clients 120 are configured to receive packet-based multimedia streams from access network 130 and process the streams for presentation on program rendering devices 124. In addition, clients 120 are network-aware resources that may facilitate bidirectional-networked communications with server side 102 resources to support network hosted services and features. Because clients 120 are configured to process multimedia content streams while simultaneously supporting more traditional Web like communications, clients 120 may support or comply with a variety of different types of network protocols including streaming protocols such as real-time transport protocol (RTP) over user datagram protocol/Internet protocol (UDP/IP), as well as web protocols such as hypertext transport protocol (HTTP) over transport control protocol (TCP/IP).

The server side 102 of MCDN 100, as depicted in FIG. 1, emphasizes network capabilities including application resources 105, which may have access to database resources 109, content acquisition resources 106, content delivery resources 107, and OSS/BSS resources 108.

Before distributing multimedia content to users, MCDN 100 first obtains multimedia content from content providers. To that end, acquisition resources 106 encompass various systems and devices to acquire multimedia content, reformat it when necessary, and process it for delivery to subscribers over private network 110 and access network 130.

Acquisition resources 106 may include, for example, systems for capturing analog and/or digital content feeds, either directly from a content provider or from a content aggregation facility. Content feeds transmitted via VHF/UHF broadcast signals may be captured by an antenna 141 and delivered to live acquisition server 140. Similarly, live acquisition server 140 may capture down-linked signals transmitted by a satellite 142 and received by a parabolic dish 144. In addition, live acquisition server 140 may acquire programming feeds transmitted via high-speed fiber feed 183 or other suitable transmission means. Acquisition resources 106 may further include signal conditioning systems and content preparation systems for encoding content.

As depicted in FIG. 1, content acquisition resources 106 include a VOD acquisition server 150. VOD acquisition server 150 receives content from one or more VOD sources that may be external to the MCDN 100 including, as examples, discs represented by a DVD player 151, or transmitted feeds (not shown). VOD acquisition server 150 may temporarily store multimedia content for transmission to a VOD delivery server 158 in communication with client-facing switch 113.

After acquiring multimedia content, acquisition resources 106 may transmit acquired content over private network 110, for example, to one or more servers in content delivery resources 107. Live acquisition server 140 is communicatively coupled to an encoder which, prior to transmission, encodes acquired content using for example, Motion Picture Expert Group (MPEG) standards such as MPEG-2, MPEG-4, a Windows Media Video (WMV) family codec, or another suitable video codec.

Content delivery resources 107, as shown in FIG. 1, are in communication with private network 110 via client facing switch 113. In the depicted implementation, content delivery resources 107 include a content delivery server 155 in communication with a live or real-time content server 156 and a VOD delivery server 158. The content provided by a VOD server is sometimes referred to as time-shifted content to emphasize the ability to obtain and view VOD content substantially without regard to the time of day or the day of week.

Content delivery server 155, in conjunction with live content server 156 and VOD delivery server 158, responds to user requests for content by providing the requested content to the user. The content delivery resources 107 are, in some embodiments, responsible for creating video streams that are suitable for transmission over private network 110 and/or access network 130. In some embodiments, creating video streams from the stored content generally includes generating data packets by encapsulating relatively small segments of the stored content according to the network communication protocol stack in use. These data packets are then transmitted across a network to a receiver (e.g., STB 121 of client 120), where the content is parsed from individual packets and re-assembled into multimedia content suitable for processing by a decoder.

User requests received by content delivery server 155 may include an indication of the content that is being requested. In some embodiments, this indication includes a network endpoint associated with the desired content. The network endpoint may include an IP address and a transport layer port number. For example, a particular local broadcast television station may be associated with a particular channel and the feed for that channel may be associated with a particular IP address and transport layer port number. When a user wishes to view the station, the user may interact with remote control device 126 to send a signal to STB 121 indicating a request for the particular channel. When STB 121 responds to the remote control signal, the STB 121 changes to the requested channel by transmitting a request that includes an indication of the network endpoint associated with the desired channel to content delivery server 155.

Content delivery server 155 may respond to such requests by making a streaming video or audio signal accessible to the user. Content delivery server 155 may employ a multicast protocol to deliver a single originating stream to multiple clients. When a new user requests the content associated with a multicast stream, there may be latency associated with updating the multicast information to reflect the new user as a part of the multicast group. To avoid exposing this undesirable latency to a user, content delivery server 155 may temporarily unicast a stream to the requesting user. When the user is ultimately enrolled in the multicast group, the unicast stream is terminated and the user receives the multicast stream. Multicasting desirably reduces bandwidth consumption by reducing the number of streams that must be transmitted over the access network 130 to clients 120.

As illustrated in FIG. 1, a client-facing switch 113 provides a conduit between client side 101, including client 120, and server side 102. Client-facing switch 113, as shown, is so-named because it connects directly to the client 120 via access network 130 and it provides the network connectivity of IPTV services to users' locations. To deliver multimedia content, client-facing switch 113 may employ any of various existing or future Internet protocols for providing reliable real-time streaming multimedia content. In addition to the TCP, UDP, and HTTP protocols referenced above, such protocols may use, in various combinations, other protocols including RTP, real-time control protocol (RTCP), FTP, and real-time streaming protocol (RTSP).

In some embodiments, client-facing switch 113 routes multimedia content encapsulated into IP packets over access network 130. For example, an MPEG-2 transport stream may be sent in which the transport stream consists of a series of 188-byte transport packets. Client-facing switch 113, as shown, is coupled to a content delivery server 155, acquisition switch 114, applications switch 117, a client gateway 153, and a terminal server 154 that is operable to provide terminal devices with a connection point to the private network 110. Client gateway 153 may provide subscriber access to private network 110 and the resources coupled thereto.

In some embodiments, STB 121 may access MCDN 100 using information received from client gateway 153. Subscriber devices may access client gateway 153, and client gateway 153 may then allow such devices to access private network 110 once the devices are authenticated or verified. Similarly, client gateway 153 may prevent unauthorized devices, such as hacker computers or stolen STBs, from accessing the private network 110. Accordingly, in some embodiments, when an STB 121 accesses MCDN 100, client gateway 153 verifies subscriber information by communicating with user store 172 via the private network 110. Client gateway 153 may verify billing information and subscriber status by communicating with an OSS/BSS gateway 167, which may translate a query to the OSS/BSS server 181. Upon client gateway 153 confirming subscriber and/or billing information, client gateway 153 may allow STB 121 access to IPTV content, VOD content and other services. If client gateway 153 cannot verify subscriber information (i.e., user information) for STB 121, for example, because it is connected to an unauthorized local loop or RG, client gateway 153 may block transmissions to and from STB 121 beyond access network 130.

MCDN 100, as depicted, includes application resources 105, which communicate with private network 110 via application switch 117. Application resources 105, as shown, include application server 160 which is operable to host or otherwise facilitate one or more subscriber applications 165 that are made available to system subscribers. For example, subscriber applications 165, as shown, include EPG application 163. Subscriber applications 165 may include other applications as well, including network-based management of CPE-based digital recording. In addition to subscriber applications 165, application server 160 may host or provide a gateway to operation support systems and/or business support systems. In some embodiments, communication between application server 160 and the applications that it hosts and/or communication between application server 160 and client 120 may be via a conventional web-based protocol stack such as HTTP over TCP/IP or HTTP over UDP/IP.

As shown in FIG. 1, a database switch 116, as connected to applications switch 117, provides access to database resources 109. Database resources 109 include database server 170 that manages a system storage resource 172, also referred to herein as user store 172. User store 172, as shown, includes one or more user profiles 174 where each user profile includes account information and may include preferences information that may be retrieved by applications executing on application server 160 including user applications 165.

User application 164, as illustrated in FIG. 1, emphasizes the ability to extend the network's capabilities by implementing a network-hosted application. Because the application resides on the network, it generally does not impose any significant requirements or imply any substantial modifications to client 120 including STB 121. In some instances, an STB 121 may require knowledge of a network address associated with user application 164, but STB 121 and the other components of client 120 are largely unaffected.

Figure 2:
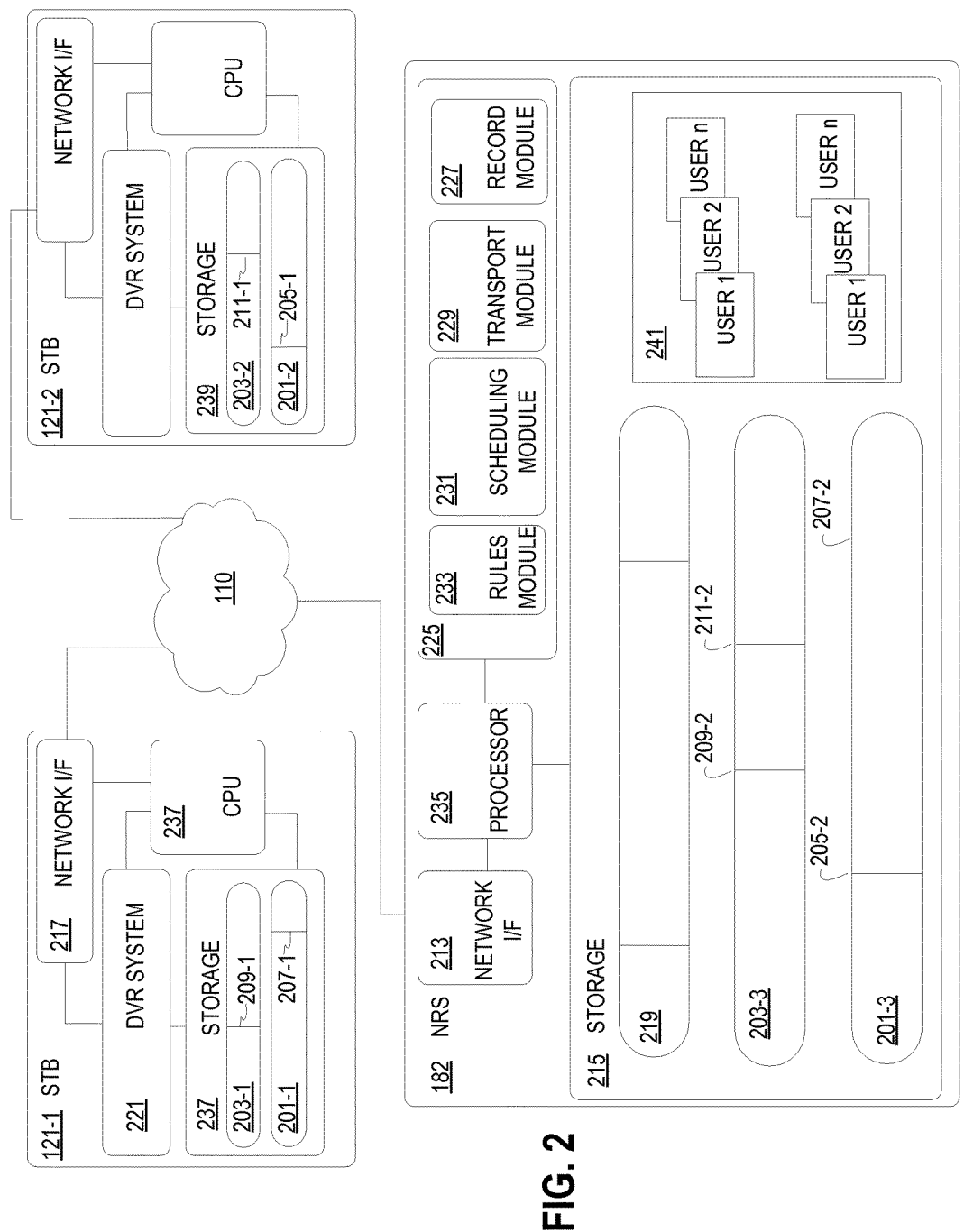
FIG. 2 is a block diagram of selected elements of a network recording system communicatively coupled to customer premises equipment (CPE) devices.

Application server 160 as shown also hosts an application referred to generically as user application 164. User application 164 represents an application that may deliver a value added feature to a user, who may be a subscriber to a service provided by MCDN 100. For example, in accordance with disclosed embodiments, user application 164 may be an application, function, or the like that records multimedia programs or performs any of the disclosed functions including a rules module, a scheduling module, or a transport module, or a network recording server. As depicted in FIG. 2 and as used herein, the term module includes one or more applications, functions, sub-routines, or the like in the form of executable instructions which may be implemented in the form of hardware, software, firmware, or any combination thereof.

As shown, MCDN 100 may implement an embodied service for recording a multimedia program. In some embodiments, a user is allotted a predetermined number (e.g., three) of high definition streams and a predetermined number (e.g., one) of standard definition streams. If a user is receiving content on every one of the allotted number of high definition streams and the user requests to record an additional high definition multimedia program, disclosed services store the requested, additional high definition multimedia program on network recording system 182. Accordingly, some embodiments of the service include receiving a user request to receive the multimedia program, detecting whether a transport stream is available to transport the multimedia program to the user, and storing (i.e., recording) the multimedia program in response to detecting that a transport stream is not available. If a transport stream becomes available, the service may include transporting the stored multimedia program to a user CPE device (e.g., STB 121) from network recording system 182. Transporting the stored multimedia program may be by download (e.g., FTP transport) or by streaming the multimedia program in real-time while it is viewed by a user.

FIG. 2 is a block diagram of selected elements of network recording system 182 that is communicatively coupled to STBs 121 via network 110 as shown. Network recording system 182 may be similar to or identical to network recording system 182 in FIG. 1 and may implement one or more of the functions, systems, methods, and processes disclosed herein. As shown, network recording system 182 includes storage 225 which is a tangible computer readable medium with computer executable instructions accessible by processor 235 for implementing rules module 233, scheduling module 231, transport module 229, and record module 227. Rules module 233 includes instructions for receiving a user request to record a multimedia program. The user request to record the multimedia program may be, for example, from a channel selection (e.g., a selection of channel 2) received by STB 121-1. In some embodiments, recording the multimedia program may automatically occur by network recording system 182 upon a user selecting a channel or multimedia program. This allows a user to automatically rewind if necessary to view portions of the multimedia program that may have been missed by the user during a viewing session.

As shown, rules module 233 includes instructions for determining whether to record a requested multimedia program to storage 215. In some embodiments, rules module 233 decides to record the multimedia program after determining that no transport stream is available for immediate transfer of the multimedia program to a user CPE device. For example, if a user is allotted two high definition transport streams and is currently viewing or locally recording (i.e., to a user PVR, DVR, or STB) using the two allotted high definition transport streams, a CPE device (e.g., STB 121) may inform rules module 233 (i.e., provide a user request to record) that no high definition transport stream is available to fulfill a received request to record a further high definition program.

In some embodiments, a user request to record a multimedia program includes a request to immediately record the multimedia program. For example, at the time of the request, a user may be allotted two high definition transport streams at a user location. If a user of a first STB at the user location requests to immediately view (i.e., view in real-time as it is streamed from an MCDN) and a user of a second STB at the location is simultaneously (at the time of the user request) presenting to another user in real-time a second high definition multimedia program, a shortage of high definition transport streams occurs if either user also requests to record a third high definition multimedia program. A shortage potentially occurs because three high definition transport streams are needed at the user location and only two are allotted. In this scenario, disclosed embodiments may immediately allocate both of the allotted high definition transport streams for real time viewing and begin recording the third high definition multimedia program on to the network recording system. In this case, a first portion of the multimedia program may be stored locally to the user CPE and a second portion of the multimedia program may be stored on the network recording system. At a later time if and when a transport stream is available, the network recording system may transport to the user CPE device the second portion of the multimedia program. Alternatively, during playback of the recorded multimedia program at the user location, a first portion of the multimedia program may be accessed from the local CPE device and the second portion of the multimedia program may be seamlessly accessed in real-time (i.e., as it is presented by a user CPE device) from the network recording system. In some implementations, management of this seamless access may be provided by a network-based application which oversees CPE-based digital recording.

In some embodiments, a user request to record a multimedia program includes a request to record the multimedia program at a future time, such as the time the multimedia program is scheduled to broadcast or air. For example, on Wednesday a user may provide user input that requests to record two high definition multimedia programs (e.g., two football games) that began to air at noon on Saturday. If the user is allotted two high definition multimedia transport streams, then no further high definition transport streams are available beginning at noon on Saturday. If before Saturday the user then provides further user input that requests to schedule to record a third high definition multimedia program (e.g., a movie) beginning at noon on Saturday, disclosed systems may indicate the conflict to the user and offer to record one or more of the requested high definition multimedia programs to the network recording system. Alternatively, disclosed embodiments may automatically (i.e., without further user input) schedule to record on the network recording system the third and any future requested multimedia programs that cause a shortage of multimedia transport streams at the given time. Accordingly, users may be permitted to record requested multimedia programs without regard to the quantity of transport streams allotted to the user.

As shown in FIG. 2, rules module 233 may apply any of several rules that may be configured by any combination of a user, an administrator, a hardware developer, a software developer, or a firmware developer. For example, rules module 233 may determine whether a requested multimedia program was previously recorded. If a requested multimedia program was previously stored by a network recording system, disclosed embodiments may store a first pointer corresponding to a begin time and a second pointer corresponding to an end time for the user requested recording. For example, as shown in FIG. 2, a user of STB 121-1 may request to receive high definition multimedia program 203 at a time when no high definition transport stream is available to STB 121-1. Accordingly, rules module 233 may determine whether multimedia program 203 was previously stored on storage 215. As shown, a copy of multimedia program 203, illustrated as multimedia program 203-3, is stored on storage 215. To conserve resources, record module 227 stores pointer 209-2 that corresponds to a start time for the user requesting to record multimedia program 203. Similarly, record module 227 may store a second pointer (not depicted in FIG. 2) that corresponds to an end time for the user requesting to record the multimedia program 203. If a user of STB 121-2 also requests to record multimedia program 203, record module 227 stores pointer 211-2 that corresponds to the start time or end time for recording multimedia program 203 as requested by the user of STB 121-2.

In addition to rules module 233 determining whether a requested multimedia program is stored within network recording system 182 (e.g., on storage 215), rules module 233 may also determine whether the requested multimedia program has been previously stored to storage 237 on STB 121-1 or storage 239 on STB 121-2. If the user of an STB 121 requests to record a multimedia program that is already stored locally to the STB, rules module 233 may deny the request to store the multimedia program to network recording system 182 or may provide a user an indication that the requested multimedia program is previously recorded or scheduled for recording locally.

As discussed, if the multimedia program was previously stored to storage 215, then rules module 233 may determine that storing the multimedia program again is unnecessary. Rules module 233, in determining whether to record the multimedia program, may also determine whether a user has exceeded an allotted capacity for storage, whether a user is a subscriber to a stream overflow service provided by network recording service 182, whether an MCDN allows recording of the multimedia program, and so forth.

As shown in FIG. 2, if a user of STB 121-1 requests to record a multimedia program at a future time, scheduling module 231 may communicate with DVR system 221 to coordinate storage of the multimedia program. In some embodiments, CPU 237 executes machine readable instructions for determining whether a multimedia transport stream is available to fulfill a user request to record a multimedia program 201 locally to STB 121-1. If no multimedia transport stream is scheduled as available during a broadcast (i.e., a recording opportunity) of multimedia program 201, DVR system 221 provides a request to scheduling module 231 to record multimedia program 201 on storage 215. If the request from DVR system 221 is for immediate viewing of a multimedia program 201, DVR system 221 may provide data for pointer 207-2 to record module 227. Accordingly, data for pointer 207-2 is stored in storage 215 and is associated with the start time corresponding to a place in multimedia program 201-3 at which DVR system 221 requested to begin recording. Pointer 207-2 provides a place within multimedia program 201-3 at which DVR system 221 begins presenting the multimedia program. In some embodiments, during transport of multimedia program 201-3 to STB 121-1 by transport module 229, only portions of the program after pointer 207-2 are downloaded to STB 121-1 as multimedia program 201-1.

As shown in FIG. 2, multimedia program 203-3 is stored in storage 215 that is communicatively coupled to network recording system 182. Pointer 209-2 corresponds to a point in multimedia program 203-3 at which STB 121-1 requested to begin recording the program. Similarly, pointer 211-2 in multimedia program 203-3 corresponds to a point at which STB 121-2 requested to record the multimedia program. Pointer 205-2 corresponds to a point in multimedia program 201-3 that STB 121-2 requested to record multimedia program 201. Pointer 207-2 corresponds to a point in multimedia program 201-3 that STB 121-1 requested to record the program. As shown, STB 121-2 includes a pointer 205-1 that indicates the point at which STB 121-2 should begin playing multimedia program 201-2 during playback. Similarly, multimedia program 203-2 includes pointer 211-1 that indicates the point at which STB 121-2 should begin playing multimedia program 203-2. Pointers 209-1 and 207-1 indicate the respective points at which STB 121-1, in cooperation with DVR system 221, should begin playing multimedia programs 203-1 and 201-1 during playback.

As shown in FIG. 2, record module 227 may automatically record popular programs to storage 215 in anticipation of requests by STBs 121 to record the programs. In such cases, record module 227 may respond to anticipated requests to record the programs by storing pointers and other similar data (e.g., user identification data) in database 241 for the pre-recorded programs. In some embodiments, record module 227 harvests and processes data from STBs 121 and other STBs within an MCDN to predict which multimedia programs are likely to be requested for recording. Accordingly, record module 227 may pre-record the programs that are predicted to be requested based on input received from a plurality of STBs.

As shown in FIG. 2, database 241 includes data that may represent network addresses, starting pointer values, ending pointer values, user settings, permissions, and the like for users that have recorded (or requested recording of) multimedia programs to network recording system 182. Disclosed embodiments provide for purging or deleting multimedia programs stored by network recording system 182. For example, if a user of STB 121-1 chooses to delete multimedia program 203-1, network recording system 182 may accordingly delete pointer 209-2 and update database 241 to indicate the deletion. If a user of STB 121-2 also chooses to delete multimedia program 203-2, network recording system 182 may delete pointer 211-2 and update database 241 to indicate the deletion. After the final user has deleted multimedia program 203-3, network recording system 182 may delete multimedia program 203-3 from storage 215. Accordingly, purging or deletion of stored multimedia programs may be automated. Alternatively, database 241 may include a maximum retention period for a user to have access to a multimedia program stored in storage 215. Rules module 233 may from time to time limit access to a multimedia program that has exceeded the maximum retention period for a user. For example, a permission status stored in database 241 for a user of STB 121-1 may be changed to prevent the user from accessing multimedia program 203-1 after a maximum retention period has expired for the program.

As shown in FIG. 2, transport module 229 includes instructions for transporting recorded programs 203-3 and 201-3 to STB 121. In addition, if STB 121 requests to record multimedia programs 219, record module 227 may store pointers associated with the request and transfer module 229 may transport the multimedia program to the STB when a transport stream becomes available. As shown, network recording system 182 communicates through network interface 213 over network 110 to STB 121-1 through network interface 217. Communication between network interface 217 and network interface 213 may be via any combination of available communication protocols or media including without limitation fiber-optic, coaxial, wired, wireless, TCP, FTP, radio, IP-based, cellular, or satellite.

As shown in FIG. 2, STB 121-1 stores transported multimedia programs (e.g., multimedia program 203-1) locally to STB 121-1 on storage 237 (e.g., a hard drive). During transport, the stream containing the multimedia program and associated components may be encrypted. Boundary keys and metadata may be stored along with the requested multimedia programs. The metadata may represent program titles, actors, ratings data, and the like. STB 121-1 may decrypt the boundary keys using an audio/video (A/V) session key. The boundary keys may be provided by components of a stream overflow service including network recording system 182. STB 121-1 may also decrypt payload that includes requested multimedia programs and metadata using a client device public key.

Transport module 229 may access database 241 for user preferences regarding when and how to transport stored multimedia programs. For example, user preferences provided by a user of STB 121-1 may dictate that transport of recorded multimedia programs occurs by FTP. The transport may be scheduled during standard off-peak hours (e.g., between 3 AM and 6 AM) or may occur during a detected transport opportunity. For example, STB 121-1 may detect an absence of user activity at any time and request download of a multimedia program from network recording system 182. Alternatively, transfer module 229 may stream a stored multimedia program in real-time to STB 121-1 as it is presented by a user CPE device. In any case, scheduling the transport of multimedia programs to a user CPE may be coordinated by the user CPE and network recording system 182. In another embodiment, this transport scheduling may be managed by a network-based CPE recording management module (not depicted).

Figure 3:
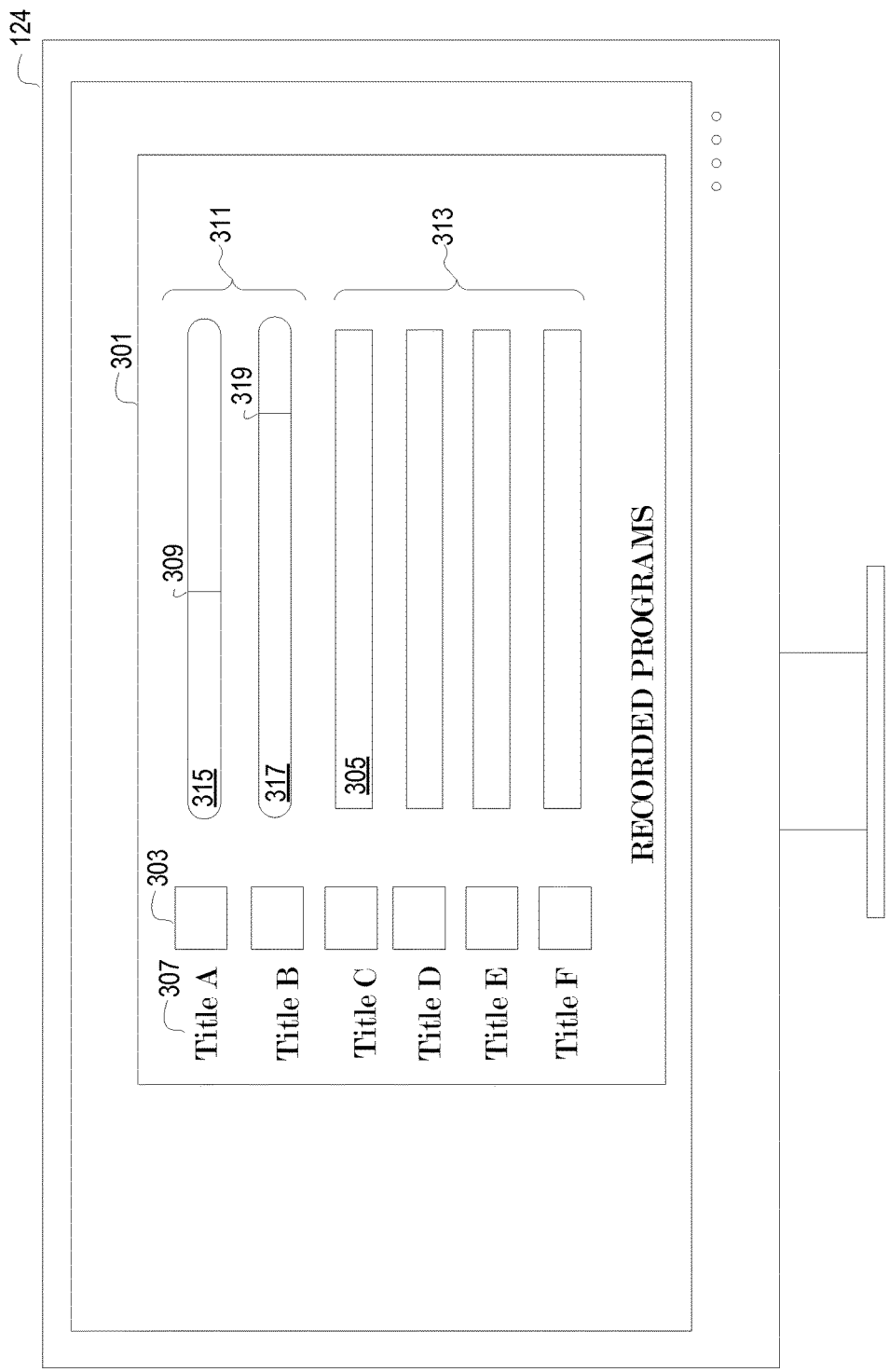
FIG. 3 illustrates an exemplary graphical user interface that includes indications of multimedia programs that are stored locally to a CPE device or remotely to a network recording system.

FIG. 3 illustrates an exemplary graphical user interface for providing a menu 301 with elements representing stored multimedia programs. As shown, multimedia programs represented in group 313 are stored locally to a user CPE device. For example, multimedia programs represented in group 313 may be stored to STB 121-1 in FIGS. 1-2. Multimedia programs represented in group 311 are stored remotely from the CPE device in the network recording system. For example, multimedia programs represented in group 311 may be stored to network recording system 182 in FIGS. 1-2. In some embodiments, portions of multimedia programs are stored both locally to a CPE (e.g., STB 121-1 in FIGS. 1-2) and remotely to a network recording system (e.g., network recording system 182 in FIGS. 1-2). Multimedia program icon 315 as shown has a rounded shape which indicates that it is stored remotely to a network recording system. Multimedia program icon 305 has a squared shape as shown that indicates it is stored locally to a CPE device (e.g., STB 121-1). As shown, multimedia program icon 315 has a pointer 309 which indicates the point at which recording of the program began for the user of program rendering device 124. Similarly, multimedia program icon 317 includes pointer 319 which indicates the point at which recording of the program began. As shown, menu 301 also includes for recorded multimedia program icon 315 a title 307 and a video image 303. Video image 303 may include still images, promotional images, or moving video images relating to the multimedia program represented by multimedia program icon 315. As shown, multimedia program icons 315 and 317 are selectable for requesting transport (e.g., through FTP transport or real-time streaming) of multimedia programs (e.g., multimedia programs 203-3 and 201-3 in FIG. 2) to a CPE device that is local to program rendering device 124.

Figure 4:
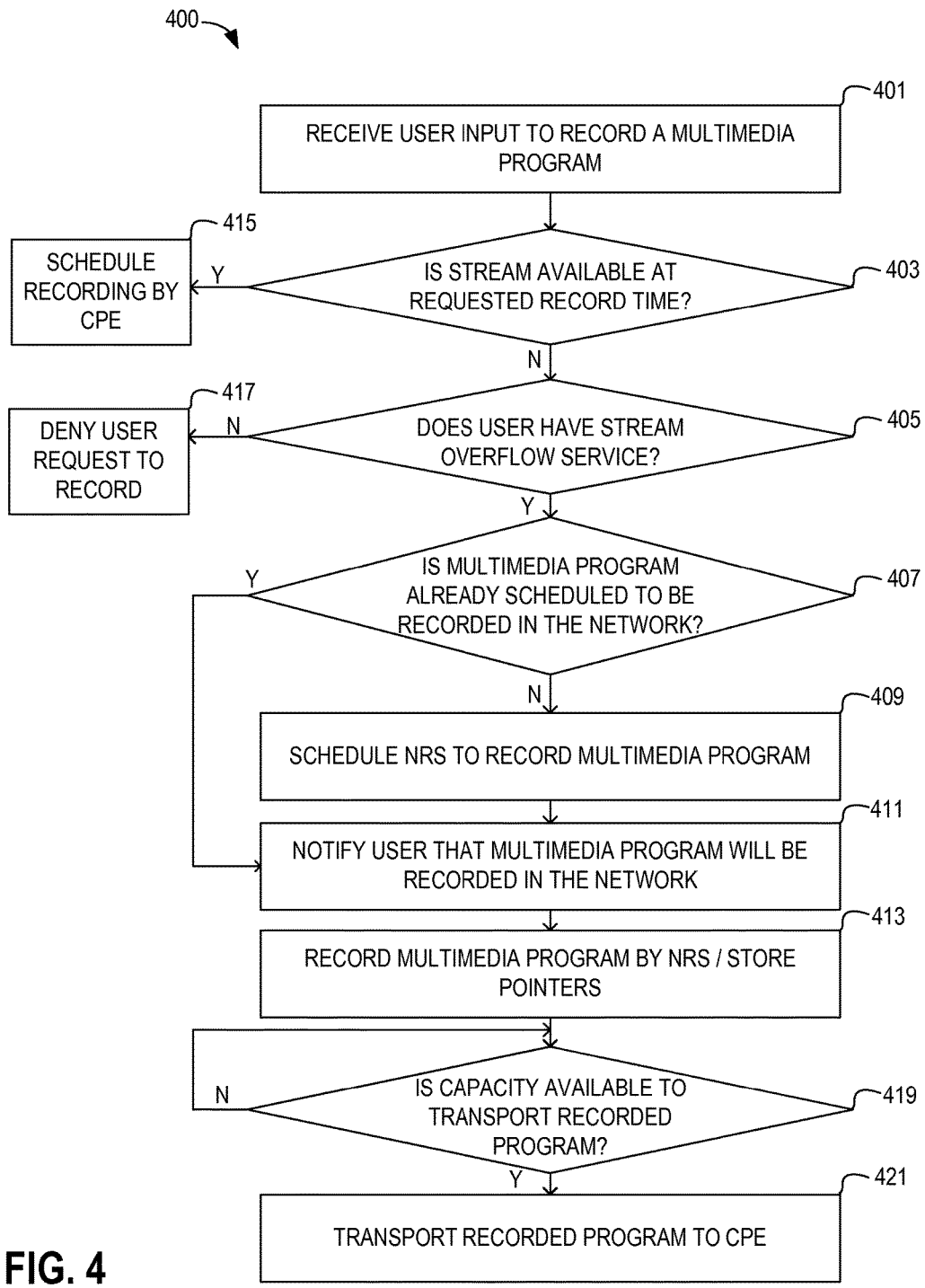
FIG. 4 illustrates selected operations of a method for recording multimedia programs to a network recording system.

FIG. 4 illustrates selected operations of process 400 for recording multimedia programs to a network recording system. User input is received (block 401) to record a multimedia program. The user input may include a request to view the multimedia program immediately or may include a request to schedule the multimedia program for recording at a future date. A determination is made (block 403) whether a transport stream is available at the requested record time. In some cases, a user may be allotted a limited number of transport streams (e.g., two high definition transport streams). If one or more of the allotted transport streams is available at the requested record time, the recording is scheduled (block 415) by a user CPE device. However, if the user is scheduled to use all of the allotted transport streams (or is using all of the allotted transport streams), the recording may be performed by a network recording system (e.g., network recording system 182 in FIG. 2). If no transport stream is available at the record time, a determination is made (block 405) whether the user has access to or subscribes to a stream overflow service. If the user does not have access to or subscribe to the stream overflow service, the user request to record is denied (block 417). However, if the user has access to or subscribes to the stream overflow service, a determination is made (block 407) whether the multimedia program is already scheduled for recording in the network. If the program is already scheduled for recording in the network, process 400 includes notifying (block 411) the user that the multimedia program will be recorded in the network. To preserve resources, storing multiple copies of a multimedia program is to be avoided. Accordingly, for each user that requests to record the multimedia program, a pointer may be stored for the user indicating a beginning recording point (e.g., a frame) and an ending recording point in the multimedia program. The beginning recording point often may be the beginning of the program and the ending recording point often may be the end of the program. If the multimedia program is not already scheduled for recording in the network or if the multimedia program that is already scheduled for recording in the network is of a different format than the format requested (e.g., standard definition rather than high definition or vice versa), the network recording system is scheduled (block 409) to record the multimedia program. At the requested record time, the multimedia program is recorded or (if applicable and as noted above) beginning and/or end pointers may be stored (block 413) by the network recording system. Upon applicable capacity (e.g., a transport stream) becoming available (block 419) to transport the recorded program, the recorded program may be transported (block 421) to a CPE device. Transporting the recorded program to the CPE device may be scheduled according to user provided parameters, according to administrator provided parameters, during off-peak hours, in response to available bandwidth (e.g., transport streams), or the like.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A process for recording a multimedia program, the process comprising:
    associating an allotted number of transport streams with a multimedia service provided via a transport network to a user, wherein the allotted number of transport streams is less than a maximum number of transport streams that a data capacity of the transport network supports;
    determining whether any of the allotted number of transport streams will be available at a requested future time indicated in a request to record a multimedia program;
    determining whether a network recording of the multimedia program is scheduled for the requested future time;
    responsive to determining that none of the allotted number of transport streams will be available at the requested future time and that a network recording of the multimedia program is not scheduled, scheduling a network recording of the multimedia program for the requested future time subject to a requirement that an allotted and available storage capacity exceed a storage space required by the multimedia program;
    after the network recording of the multimedia program at the requested future time completes, transporting the network recording to the user;
    responsive to detecting a change of channel to a selected channel playing a present multimedia program, automatically performing a network recording of the present multimedia program; and
    responsive to determining that at least one of the allotted number of transport streams is available at the requested future time, locally recording a first portion of a particular multimedia program on a customer premises device; and
    responsive to determining, while locally recording the first portion of the particular multimedia program, that the allotted number of transport streams is exceeded, recording a second portion of the multimedia program to a network recording system, wherein the first portion comprises a portion of the multimedia program occurring before the allotted number of transport streams was exceeded and wherein the second portion comprises a portion of the program occurring after the allotted number of transport streams occurred; and
    playing back the particular multimedia program, including retrieving the first portion of the particular multimedia program from the customer premises device and retrieving the second portion of the multimedia program from the network recording system.

2. The process of claim 1, further comprising:
    notifying the user of the scheduling of the network recording.

3. The process of claim 1, further comprising:
    recording, at the requested future time, the multimedia program on the network; and
    storing metadata for the multimedia program on a network recording server.

4. The process of claim 1, further comprising:
    scheduling the transporting of the network recording in accordance with at least one user-provided scheduling parameter.

5. The process of claim 1, wherein transporting the network recording includes downloading the network recording to the user.

6. The process of claim 1, wherein transporting the network recording includes streaming the network recording to the user.

7. The process of claim 1, further comprising:
    storing pointers to at least one of a start frame and an end frame of the network recording, wherein the start frame and the end frame are indicative of a portion of the network recording available to the user for playback.

8. A network recording server comprising:
    a processor; and
    a computer readable storage medium, accessible to the processor and including processor executable instructions that, when executed by the processor, cause the processor to perform operations comprising:
    associating an allotted number of transport streams with a multimedia service provided via a transport network associated with a user, wherein the allotted number of transport streams is less than a maximum number of transport streams that a data capacity of the transport network supports;
    responsive to receiving a user request to record, at a future time, a multimedia program, determining whether any of the allotted number of transport streams will be available at the future time;

responsive to determining that none of the allotted number of transport streams will be available at the future time, determining whether a network recording of the multimedia program is already scheduled for the future time;

responsive to determining that a network recording of the multimedia program is not already scheduled, comparing a storage capacity required for storing the multimedia program to an allotted storage capacity;

responsive to determining that the user has not exceeded the allotted network storage capacity, scheduling a network recording of the multimedia program for the future time;

after the network recording of the multimedia program completes, transporting the network recording to the user responsive to determining that the multimedia content distribution service associated with the user has sufficient available capacity;

responsive to detecting a change of channel to a selected channel playing a present multimedia program, automatically performing a network recording of the present multimedia program;

responsive to determining that at least one of the allotted number of transport streams is available at the requested future time, locally recording a first portion of a particular multimedia program on a customer premises device;

responsive to determining, while locally recording the first portion of the particular multimedia program, that the allotted number of transport streams is exceeded, recording a second portion of the multimedia program to a network recording system; and playing back the particular multimedia program, including retrieving the first portion of the particular multimedia program from the customer premises device and retrieving the second portion of the multimedia program from the network recording system.

9. The server of claim 8, wherein the operations include:
notifying the user of the scheduling of the network recording.

10. The server of claim 8, wherein the operations include:
recording, at the future time, the multimedia program and storing the network recording on the network;
storing metadata for the multimedia program on the network recording server; and
scheduling the transporting of the network recording for off peak hours.

11. The server of claim 10, wherein the operations include:
generating a graphical user interface including a menu of icons representing stored multimedia programs, wherein the menu of icons is indicative of a storage location of the applicable stored multimedia program, wherein storage locations are selected from network recording system storage and customer premises storage,
wherein the storage location is indicated by at least one of a grouping of the icons within the menu and by a shape of the icon;
wherein a first particular icon corresponding to a first stored program includes a first pointer indicative of a point at which recording of the first program began; and
wherein the menu includes a title and a video image associated with at least one of the stored multimedia programs.

12. The server of claim 8, wherein transporting the network recording includes downloading the network recording to the user.

13. The server of claim 8, wherein transporting the network recording includes streaming the network recording to the user.

14. The server of claim 8, further comprising:
storing pointers to at least one of: a start frame and an end frame, wherein the start frame and the end frame are indicative of a portion of the network recording available to the user for playback.

15. A non-transitory computer readable storage medium, accessible to a processor and including processor executable instructions that, when executed by the processor, cause the processor to perform operations comprising:

associating an allotted number of transport streams with a multimedia service provided via a transport network to a user, wherein the allotted number of transport streams is less than a maximum number of transport streams that a data capacity of the transport network supports;

responsive to receiving a user request to record, at a requested time in the future, a multimedia program, determining whether any of the allotted number of transport streams will be available at the requested time in the future;

responsive to determining that none of the allotted number of transport streams will be available at the requested time in the future, determining whether a network recording of the multimedia program is already scheduled for the requested time in the future;

responsive to determining that a network recording of the multimedia program is not already scheduled, comparing a storage capacity required for storing the multimedia program to an allotted storage capacity;

responsive to determining that the user has not exceeded the allotted network storage capacity, scheduling a network recording of the multimedia program for the requested time in the future;

responsive to detecting a change of channel to a selected channel playing a present multimedia program, automatically performing a network recording of the present multimedia program responsive to determining that the multimedia program is currently being stored to a network recording system, providing information indicating a portion of the multimedia program available to the user; and after the network recording of the multimedia program completes, transporting the network recording to the user responsive to determining that the multimedia content distribution service associated with the user has sufficient available capacity responsive to determining that at least one of the allotted number of transport streams is available at the requested future time, locally recording a first portion of a particular multimedia program on a customer premises device;

responsive to determining, while locally recording the first portion of the particular multimedia program, that the allotted number of transport streams is exceeded, recording a second portion of the multimedia program to a network recording system; and playing back the particular multimedia program, including retrieving the first portion of the particular multimedia program from the customer premises device and retrieving the second portion of the multimedia program from the network recording system.

16. The non-transitory computer readable medium of claim 15, wherein the operations include:
notifying the user of the scheduling of the network recording.

17. The non-transitory computer readable medium of claim 15, wherein the operations include:
recording, at the requested time in the future, the multimedia program on the network; and
storing metadata for the multimedia program on a network recording server.

18. The non-transitory computer readable medium of claim 17, wherein the operations include:
scheduling the transporting of the network recording in accordance with at least one administrator-provided scheduling parameter.

19. The non-transitory computer readable medium of claim 15, further comprising:
storing pointers to at least one of a start frame and an end frame, wherein the start frame and the end frame are indicative of a portion of the network recording available to the user for playback.

* * * * *